May 17, 1966

O. HOPPMANN 3,251,449

TRANSLOADING DEVICE

Filed April 13, 1964

Inventor:
Otto Hoppmann
By
Walter Becker

May 17, 1966  O. HOPPMANN  3,251,449
TRANSLOADING DEVICE

Filed April 13, 1964  5 Sheets-Sheet 3

Inventor:
Otto Hoppmann
By

May 17, 1966  O. HOPPMANN  3,251,449
TRANSLOADING DEVICE
Filed April 13, 1964  5 Sheets-Sheet 4

Inventor:
Otto Hoppmann

United States Patent Office 3,251,449
Patented May 17, 1966

3,251,449
TRANSLOADING DEVICE
Otto Hoppmann, Mulheim an der Ruhr, Heissen, Germany, assignor to Beteiligungs- und Patentverwaltungsgesellschaft mit beschrankter Haftung, Essen, Germany
Filed Apr. 13, 1964, Ser. No. 359,269
5 Claims. (Cl. 198—9)

The present invention relates to a transloading device, i.e. a device for unloading material onto a storage place and for picking up the material from said storage place and conveying it to another place.

Devices of this general type are known according to which combined unloading and loading means are employed in combination with a reversible belt conveyor. One of these known devices is a so-called bucket wheel loader having a reversible belt supported by its boom. For unloading the goods onto a storage place, the material conveyed to the bucket wheel loader by conveying means is through the intervention of a belt loop carriage unloaded onto the boom conveyor belt of the bucket wheel loader which last mentioned conveyor belt unloads the goods laterally of the bucket wheel.

For purposes of picking up and removing the poured material from the storage place, the belt loop carriage is lowered to such an extent that said carriage can be moved through the gate-like understructure of the bucket wheel loader. Thereupon, the conveying direction of the conveyor belt co-operating with said carriage and also the conveyor belt on the boom have their conveying direction reversed. It will be appreciated that the conveyor belt on the boom will unload the material picked up by the bucket wheel within the said gate onto the carriage belt section from where the goods will be conveyed either to the same place from where it was brought to the storage place or to any other place where it may be required.

It is an object of the present invention to provide a transloading device of the above mentioned general type, which will be greatly simplified over the heretofore known devices of the type involved.

It is another object of this invention to provide a transloading device with a delivery conveyor and a conveyor on the boom, which will make it possible in a simple manner to convey the goods from one conveyor to the other conveyor and vice versa without detaching the delivery conveyor or effecting time consuming changing operations with regard thereto.

These and other objects and advantages of the invention will appear more clearly from the following specification in connection with the accompanying drawings, in which:

FIG. 1 diagrammatically illustrates an overall view of a transloading device according to the invention.

Figure 1:
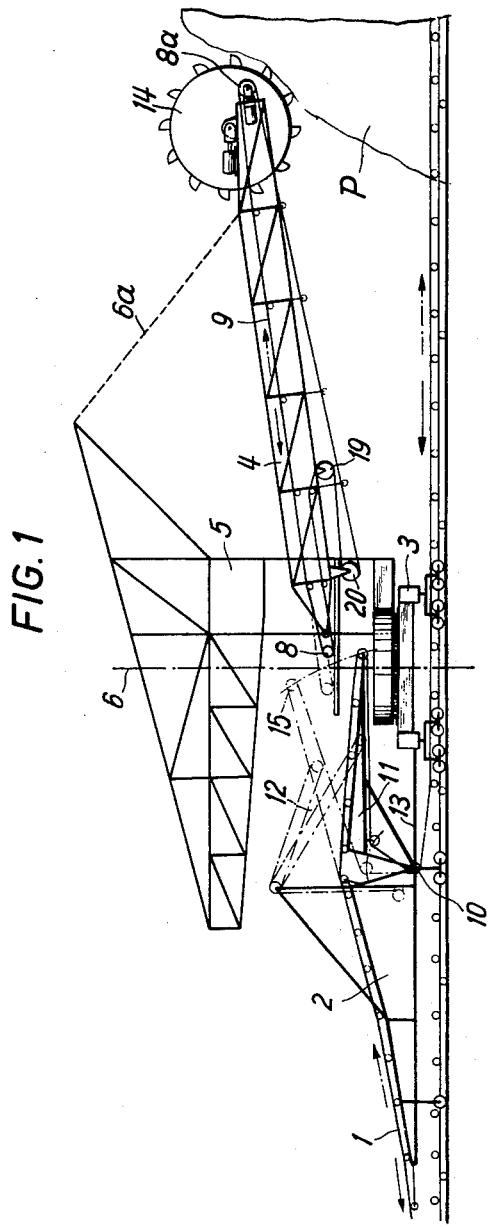

The transloading device according to the present invention comprises in a manner known per se a reversible conveyor belt on a boom and a delivery conveyor belt including a belt loop carriage the loop supporting means of which may be moved from a posiiton in which the material is conveyed from the delivery conveyor to the boom conveyor into a position in which it will be able to receive the goods from the boom conveyor and deliver the goods to a station away from said boom conveyor and vice versa.

The invention is characterized primarily in that the outer end of the belt loop carriage is adapted to be moved into a receiving position below that reversing drum of the boom conveyor belt which is adjacent the delivery belt loop carrier while occupying a position within the upper frame work of the device. The said reversing drum of the boom conveyor is advantageously adjustable within the upper structure of the device in such a way that in one position of the drum the boom conveyor belt will receive the material discharged by the lifted belt loop, whereas in another position of said drum, the boom conveyor will discharge the goods picked up from the storage place by the bucket wheel onto said belt loop support. Preferably, the adjusting stroke of said reversing drum is so great and the guiding path over which said drum moves is so designed that, without any movement of the belt loop carriage in longitudinal direction of the belt section supported thereby, it is possible to move said belt section selectively above or below the boom conveyor belt.

Referring now to the drawing in detail, the transloading device shown therein comprises a delivery conveyor belt 1 for conveying material to and from a storage place. Belt 1 passes over a belt loop carriage 2 the carriage structure of which in the manner of a cantilever overlaps a part of the frame work of the unloader generally designated O.

The unloader O which according to FIG. 1 is a bucket wheel unloader, is displaceable above and relative to the delivery conveyor. The unloader O comprises an understructure 3 supporting a C-shaped upper structure 5 which in its turn by means of a cable 6a and a shaft 6b pivotally supports a boom 4. It is, of course, to be understood that the cable 6a can in customary manner, for instance by means of a winch, be so actuated as to lift and lower the front end of the boom. The upper structure 5 is journalled so as to be rotatable about a vertical axis 6. The inner end of boom 4 carries a reversing drum 8 which is arranged within the upper structure 5 as will be evident from the drawing. The said reversing drum 8 is displaceable along a substantially horizontal plane to such an extent that it will not interfere with the movement of the belt loop support 11 from its solid position in FIG. 2 to its dot-dash position and vice versa. As will be seen from FIG. 2, the reversing drum 8 is supported by a carriage 16 equipped with rollers 16a guided on rails 7. The movement of carriage 16 is effected by means of a cable 18 passing over rollers 18a and 18b which latter are adapted to be driven by a motor 17.

Figure 2:
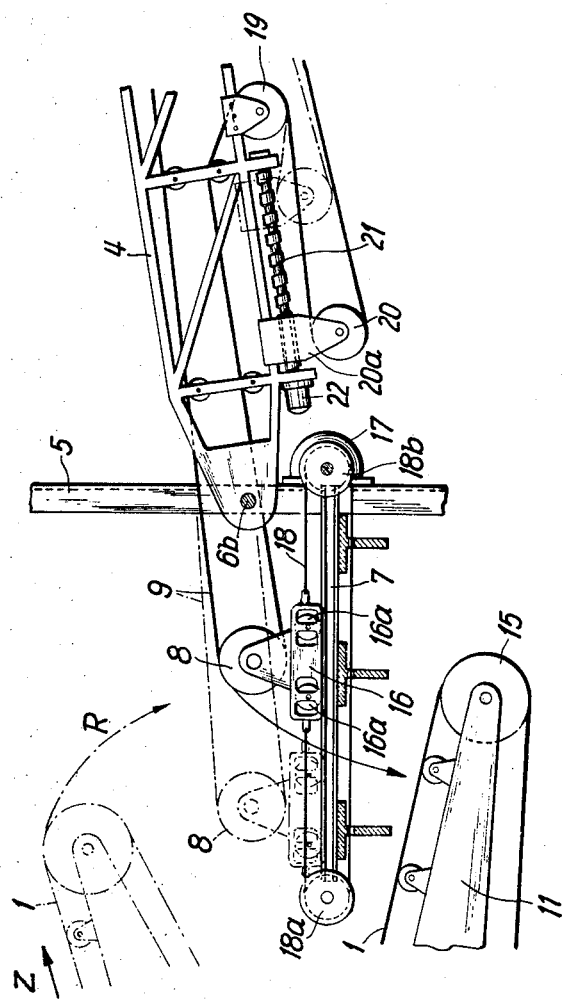
FIG. 2 illustrates on a somewhat larger scale than FIG. 1 the central portion thereof within the dot-dash circle of FIG. 1 and in particular shows a reversing roller of the conveyor belt of the boom journalled on a carriage movable relative to said boom.

As will be seen from FIG. 2, the boom belt 9 in addition to passing over the inner reversing drum 8 also passes over reversing rollers 19 and 20 to the outer reversing drum 8a and from there back to inner reversing drum 8. The reversing roller 20 acts as a tensioning roller and is supported by a threaded supporting member 20a which is guided on a spindle 21 journalled in the boom 4. The spindle 21 has drivingly connected thereto a reversible motor 22 adapted when actuated to rotate the spindle 21 in one or the other direction so as to move the tensioning roller 20 toward the right or toward the left with regard to FIG. 2.

Figure 7:
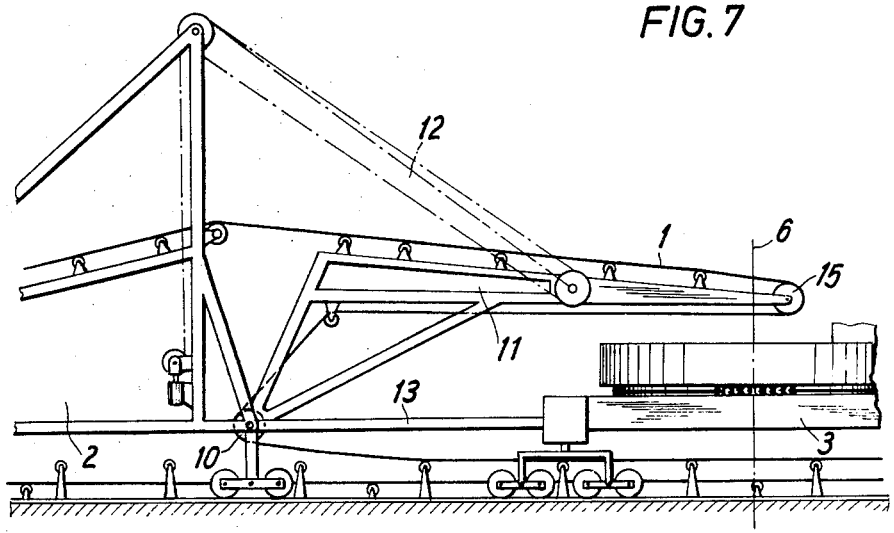
FIG. 7 shows the left side of FIG. 1 at somewhat larger scale.
Figure 8:
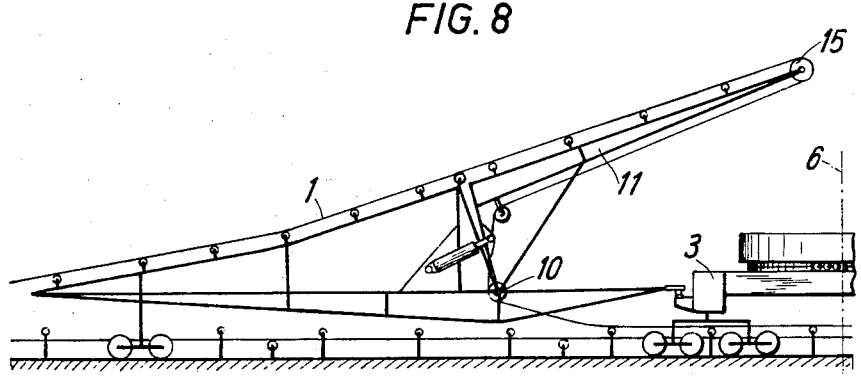
FIG. 8 shows a modification wherein the delivery conveyor is connected to the understructure of the unloader by a ball joint.

The belt loop support 11 is carried by the belt loop carriage 2 and is pivotally connected thereto at 10 so that said belt loop support 11 may be tilted upwardly and downwardly while said carriage is held stationary. The lifting and lowering of the belt loop support 11 may be effected in any convenient manner, for instance by means of a tackle, cable line, fluid operable cylinder piston system, or the like. For the sake of simplicity, FIG. 1 shows a cable line 12 for this purpose. The belt loop carriage 2 is coupled to the bucket wheel loader O or, more specifically, the understructure 3 thereof by means of a rod 13. See FIGS. 7 and 8.

*Operation of the arrangement of FIGS. 1 and 2*

Assuming that all parts of the device occupy the position shown in solid lines. In this position the bucket wheel 14 picks up material from the pile P and conveys the material over the boom conveyor 9 which at its reversing drum 8 unloads the material onto that delivery belt section which is carried by the belt loop support 11. From here the delivery belt conveys the material to a pick-up station from where it is then brought to the place where it is required. If it should be desired that material be conveyed in the opposite direction, in other words be conveyed from the delivery conveyor 1 via the boom conveyor 9 to pile P, it will, of course, be necessary to tilt the belt loop support 11 upwardly, for instance into the position shown in dot-dash lines in FIG. 2, in which the delivery belt section carried by the belt loop support 11 will be above the boom belt 9 so as to discharge the material from the delivery belt 1 onto the boom belt 9.

In order to be able to effect this upward movement of the belt loop support 11 without movement of the carriage 2, it is merely necessary to withdraw the reversing drum 8 from the path of the tilting movement of belt loop support 11. To effect this withdrawal of reversing drum 8, the operator starts the motor 17 so as to turn the roller 18b in clockwise direction. As a result thereof, the cable 18 moves the carriage 16 and thereby the reversing drum 8 toward the right out of the tilting path of belt loop support 11. When the reversing drum 8 has been moved out of the tilting path of belt loop support 11, the motor 17 is stopped. The belt loop support 11 may now be tilted from its solid line position in FIG. 2 to the dot-dash line shown therein.

The operator then starts the motor 22 so as to move the roller support 20a and thereby the tensioning roller 20 from its solid line position of FIG. 2 to its dot-dash line position shown therein. This slackens the boom belt 9 to a sufficient extent for the now following adjustment of the reversing drum 8. After the tensioning roller 20 has reached its dot-dash line position which is close to its possible end position, the motor 22 is stopped and motor 17 is started again but this time in such a direction as to turn the roller 18b in counterclockwise direction. Consequently, the carriage 16 with the reversing drum 8 now moves toward the left with regard to FIG. 2. When the carriage with drum 8 has reached its dot-dash line position of FIG. 2, the boom belt 9 is sufficiently taut and motor 17 is stopped. As will be evident from the drawing, material conveyed in the direction of the arrow Z on the delivery belt 1 will be discharged onto the boom belt 9 as indicated by the arrow R. As will be evident from FIG. 1, the material on the boom belt 9 is discharged onto pile P laterally of the bucket wheel 14. It will be appreciated that since the boom is tiltable about shaft 6b upwardly and downwardly and since furthermore boom 4 is turntable about the axis 6, a wide range of the storage place can be covered by the bucket wheel 14 and the boom belt 9 so that loading and unloading can be effected over a wide area. It is also to be understood that it is, of course, possible to move both left conveyors as a unit in order to transport the transloading device from one location to another location.

It is, of course, to be understood that a rail 7 with carriage 16 is located on both sides of the boom and the rails are so located that they will not be within the tilting path of the belt loop support 11.

Figure 3:
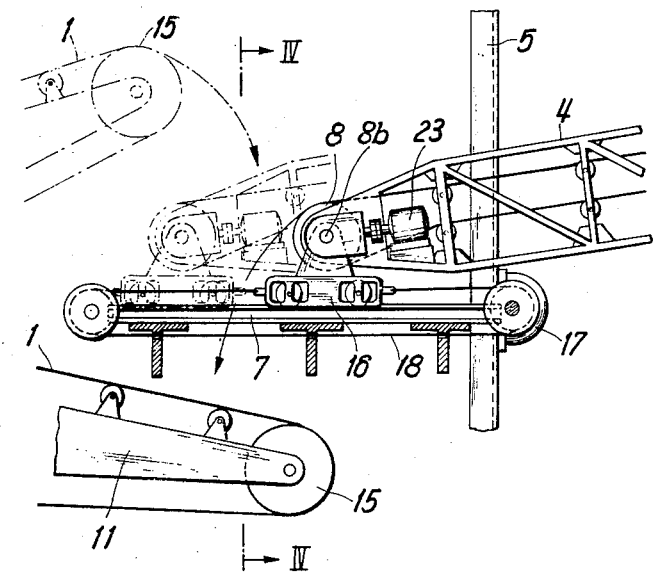
FIG. 3 is a view similar to that of FIG. 2 but differing therefrom in that the reversing roller pertaining to the conveyor belt of the boom is connected thereto so as to be displaceable together with the boom.
Figure 4:
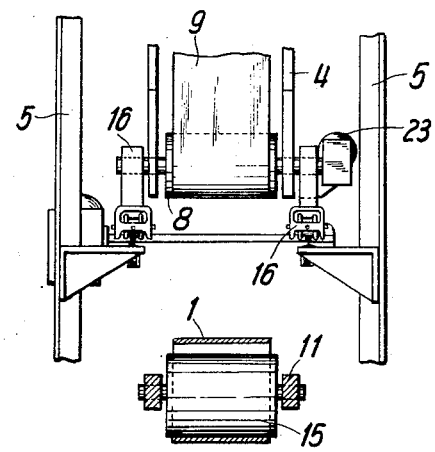
FIG. 4 is a section taken along the line IV—IV of FIG. 3.

*Embodiment of FIGS. 3 and 4*

The embodiment of FIGS. 3 and 4 differs from that of FIGS. 1 and 2 in that the reversing drum 8 is rotatably supported by the boom 4 so as to move in unison therewith. Therefore, in order to move the reversing drum 8 out of the tilting range of the belt loop support 11, it is necessary to move the entire boom.

More specifically, with regard to FIG. 3, the reversing drum 8 is supported by a shaft 8b which extends through the lateral frames of boom 4 and is supported by carriages 16 corresponding to the carriages 16 of FIGS. 1 and 2. The operation of said carriages is precisely the same as described in connection with FIGS. 1 and 2 so that a further description thereof does not appear to be necessary. FIGS. 3 and 4 also show a motor 23 which is drivingly connected to the drum 8 for driving the conveyor belt 9.

As will be seen from FIG. 4, the rails 7 and carriages 16 are located laterally of the side walls of the boom 4 while being spaced from each other by a distance wider than the width of the belt loop support 11 so that the tilting movement of the belt loop support 11 will not be interfered with by said rails.

Figure 5:
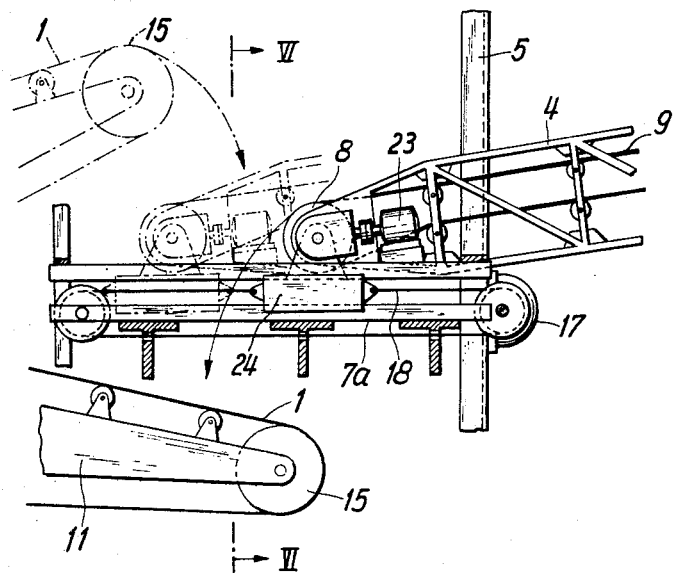
FIG. 5 is a view similar to that of FIG. 3 but differing therefrom in that the movement of the reversing roller pertaining to the conveyor belt of the boom is effected by means of a slide rather than a carriage.
Figure 6:
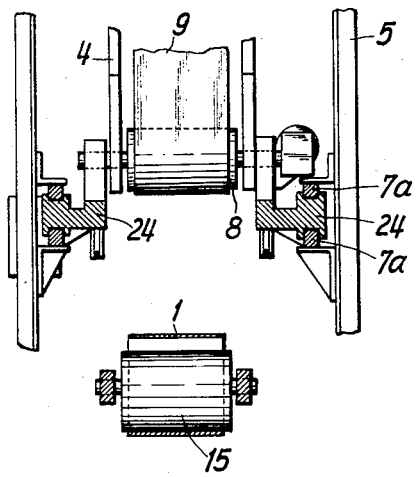
FIG. 6 is a section taken alonge the line VI—VI of FIG. 5.

*Embodiment of FIGS. 5 and 6*

The arrangement of FIGS. 5 and 6 corresponds substantially to that of FIGS. 3 and 4 and differs therefrom merely in that the carriage 16 has been replaced by a slide 24 reciprocably slidably mounted on rails 7a. The slide 24 is movable back and forth in the same manner as carriage 16 of FIGS. 1 to 4 and corresponding parts have been designated with the same characters. As will be seen from FIG. 6, each slide 24 on each side of boom 4 is guided by a top and bottom rail 7a. Otherwise the operation of the arrangement of FIGS. 5 and 6 fully corresponds to the operation of the devices described above.

It is, of course, to be understood that the present invention is, by no means, limited to the particular embodiments referred to above but also comprises any modifications within the scope of the appended claims. Thus, instead of the bucket wheel 14 there may be provided another scooping device. Furthermore, the belt loop carriage 2 may be so designed that only that end thereof which is remote from the boom 4 rests on trucks or the like at both sides of the transloading device. In this instance, the front end of the carriage which is coupled to the understructure 3 by rod 13 may rest on said understructure by means of a ball joint. See FIG 8.

What I claim is:

1. A transloading device for selectively conveying material from one station to another and vice versa, comprising; a moveable lower support structure, an upper structure pivoted on a vertical axis on said lower support structure, a first tiltable boom having one end mounted on said upper structure and its other end extending therefrom, a belt supporting drum carried by one of said first boom or said upper structure adjacent the said one end of the first boom and located near said axis and being bodily moveable with regard to said upper structure, a belt loop carriage connected to said lower support structure, a second tiltable boom having one end pivoted to said belt loop carriage on a horizontal axis and having its other end extending over said upper structure to the region of said drum, said second boom being moveable about its pivotal end to dispose said other end thereof above or below the level of said drum, means for moving said drum on said upper structure from a first position of overlapping relation to said other end of said second boom to a second position out of the path of said other end of the second boom during said movement of said second boom about its pivotal end, a first reversible conveyor belt on said belt loop carriage and passing around the said other end of said second boom, and a second reversible conveyor belt on said first boom and passing around said drum whereby material can be passed from either conveyor belt to the other thereof while movement of said second boom about its pivotal end can be effected without changing the spatial relation of said belt loop carriage and said lower support structure.

2. A transloading device according to claim 1 in which said drum is mounted in the said one end of said first boom, support means on said upper structure slidably supporting said one end of said first boom on said upper structure, and said means for moving at least said drum on said upper structure comprising means for moving said first boom together with said drum along said support means.

3. A transloading device according to claim 1 in which said belt loop carriage is partially supported by said lower support structure.

4. A transloading device according to claim 1 in which support means are provided on said upper structure slidably supporting said drum independently of said first boom, and said means for moving said drum on said upper structure comprising means for moving said drum along said support means independently of said first boom.

5. A transloading device according to claim 4 in which spaced idlers are provided on said first boom about which said second belt is entrained, and means for adjusting said idlers toward and away from each other to maintain said second belt taut for adjusted positions of said drum along its said supporting means.

References Cited by the Examiner
UNITED STATES PATENTS
2,762,141   9/1956   LeTourneau _____ 198—9 X FOREIGN PATENTS
1,142,572   4/1957   France.
1,327,791   4/1962   France.

SAMUEL F. COLEMAN, *Primary Examiner.*